May 30, 1967

J. M. WOODALL 3,322,501

PREPARATION OF GALLIUM ARSENIDE WITH CONTROLLED SILICON CONCENTRATIONS

Filed July 24, 1964

INVENTOR
JERRY M. WOODALL

BY Thomas J. Kilgannon Jr.

ATTORNEY

United States Patent Office 3,322,501
Patented May 30, 1967

3,322,501

PREPARATION OF GALLIUM ARSENIDE WITH CONTROLLED SILICON CONCENTRATIONS

Jerry M. Woodall, Putnam Valley, N.Y., assignor to International Business Machines Corporation, New York, N.Y., a corporation of New York Filed July 24, 1964, Ser. No. 384,877
9 Claims. (Cl. 23—204)

This invention relates to techniques for preparing high purity materials, and in particular to techniques for producing high purity monocrystalline materials by reducing silicon contamination in these materials which results from their preparation in fused silica vessels.

A great deal of research is presently being done relating to materials with the intermetallic compounds being the focus of attention since the advent of the semi-conductor laser. Gallium arsenide has already been widely used for lasers and other intermetallic compounds such as indium phosphide and indium arsenide are being studied for effects similar to those obtained with gallium arsenide. The study of the materials mentioned, particularly of high purity, has been severely limited and their application to production methods delayed because of the difficulties encountered in producing single crystals and in producing sufficiently large quantities of such materials.

There are a number of known techniques for producing high purity gallium arsenide. Some utilize the Czochralski technique while others utilize the Horizontal Bridgeman technique. Using the Czochralski technique, it has been most difficult to obtain high purity single crystals except under tightly controlled environmental conditions. In a known Horizontal Bridgeman technique, the gallium arsenide is obtained by means of a reaction which is self-limiting thereby preventing the growth of large crystals. Also, in this latter technique the process produces single crystals only under rigidly controlled conditions.

To a certain extent, the techniques used in producing high purity gallium arsenide have been dominated by efforts to reduce the contamination of the resulting crystals by silicon which is liberated from quartz containers used in known crystal growing techniques. The contamination is thought to result from a reaction between silica and gallium which liberates the contaminating silicon when gallium arsenide is prepared at temperatures in excess of 1000° C. Silicon contaminaton of the intermetallic compounds which come principally from group III and Group V elements of periodic chart of the elements, results in a degradation of the electrical properties of the resulting crystal. In particular, the electron mobility of the resulting material is lowered. The factors which contribute to higher carrier mobility also contribute to high minority carrier mobility which is an important determinant of device speed. For example, the limiting frequency at which a transistor can be operated is increased as the minority carrier mobility, and hence the transmit time across the base region, is increased.

The adverse effect of silicon contamination has been minimized in some systems by the utilization of special vessels made of aluminum nitride. The expense and availability of vessels of good quality made of this material make this technique somewhat undesirable. Other known techniques, as has been mentioned, do not consistently produce single crystals or, if single crystals can be obtained, they are not large enough to provide for production operations. The present invention provides a technique for providing large size, single crystals of gallium arsenide which are uncontaminated with silicon while utilizing inexpensive and readily available silica vessels.

In accordance with the invention, when preparing gallium arsenide, the reaction between gallium and silica is suppressed by virtue of the pressure exerted by an atmosphere of gallous oxide ($Ga_2O$). The resulting purity and type of crystal produced is affected by the pressure applied and by the fact that in the technique taught here the products of the reaction used are non-contaminating. Because the reaction products are non-contaminating, single crystal gallium arsenide of high purity can be produced with relative ease as compared with prior art techniques.

The technique of the present invention utilizes the following reaction.

$$2C+Ga_2O_3 \rightarrow Ga_2O+2CO$$

A quantity of gallic oxide ($Ga_2O_3$) in excess amounts is placed in a carbon boat in a furnace. As with the usual Horizontal Bridgeman technique, the gallium is placed in a silica boat at the high temperature end of the furnace and a quantity of arsenic is placed in the furnace at its low temperature end. The carbon boat containing the gallic oxide is placed in the furnace at an intermediate temperature at which the carbon of the boat and the gallic oxide react to produce the gallous oxide and carbon monoxide end products.

Silica contamination of the crystal is thought to result from the following reaction.

$$4Ga+SiO_2 \rightarrow 2Ga_2O+Si$$

The production of $Ga_2O$ from the carbon, gallic oxide reaction, tends to prevent the reaction of gallium and silica and the amount of silicon contamination appearing in the resulting crystal is proportional to the pressure of the gallous oxide atmosphere present. As will be seen from the detailed explanation of this technique, the pressure of the gallous oxide is proportional to the temperature at which the carbon, gallic oxide reaction occurs. Because of this, the pressure of the gallous oxide can be varied by a change in temperature and the Si concentration in the resulting crystal may then be varied.

It is, therefore, an object of this invention to provide a method of producing high purity monocrystalline gallium arsenide crystals which are superior to those produced by prior art methods.

Another object is to provide a method for preparing gallium arsenide with controllable amounts of Si.

Another object is to provide a method for producing gallium arsenide crystals with substantially reduced silicon contamination relative to those produced by prior art methods.

Another object is to provide a method for producing monocrystalline high purity crystals of gallium arsenide in production quantities.

Still another object is to provide an economical method for producing crystals of high purity gallium arsenide.

Yet another object is to provide a method for producing gallium arsenide crystals which have silicon concentrations several orders of magnitude less than those of prior art methods.

A further object is to provide a method of preparing high mobility gallium arsenide in fused silica vessels.

A feature of this invention is the utilization of a method for producing gallium arsenide crystals which includes the step of reacting gallic oxide with carbon to produce gallous oxide and a non-contaminating compound of carbon within a closed Horizontal Bridgeman system which is designed to provide gallium arsenide crystals by the reaction of gallium and arsenic.

Another feature is the utilization of a crystal growing technique which includes the steps of placing a quantity of gallic oxide in a carbon boat, introducing the boat into a closed system, and heating at a given temperature to produce a given pressure of gallous oxide to suppress the formation of free silicon during the formation of gallium arsenide at a higher temperature.

A further feature is the utilization of a method for producing gallium arsenide which includes the steps of generating an atmosphere of gallous oxide and carbon monoxide within a closed system to suppress the formation of free silicon thereby providing a high purity single crystal of gallium arsenide.

The foregoing and other objects, features and advantages of the invention will be apparent from the following more particular description of a preferred embodiment of the invention as illustrated in the accompanying drawings.

In accordance with the present invention gallic oxide ($Ga_2O_3$) is made to react with carbon to produce an atmosphere of gallous oxide and a non-contaminating compound of carbon at a given pressure to suppress the formation of free silicon which acts as a contaminant in gallium arsenide.

Figure 1:
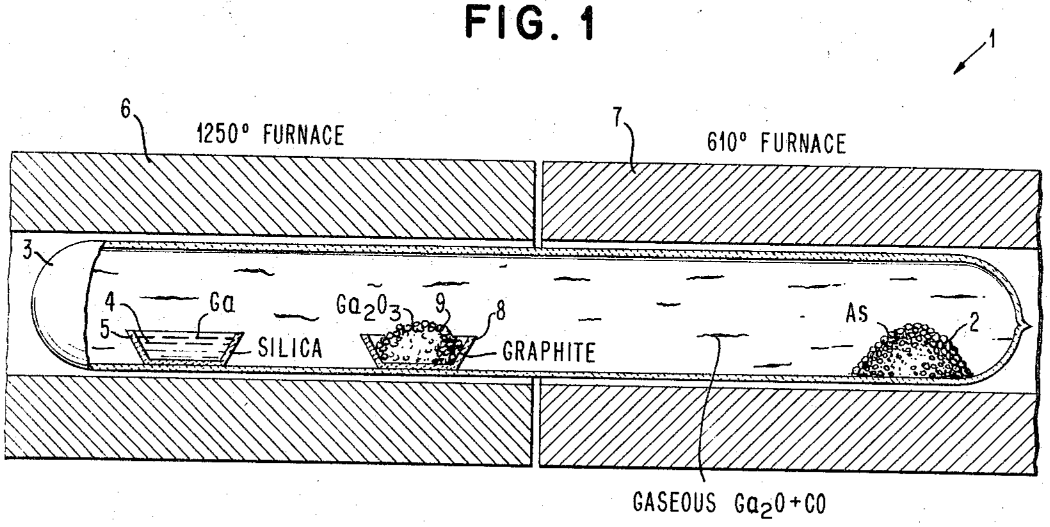
FIGURE 1 is a cross-sectional drawing of a closed system illustrating the method of this invention for the preparation of high purity gallium arsenide.

Referring now to FIG. 1 there is shown a closed system 1 in which crystals of gallium arsenide may be formed by reacting a quantity of arsenic 2 disposed at the low temperature end of a reaction tube 3 and a quantity of gallium 4 disposed in a silica vessel or boat 5 at the high temperature end of tube 3. Furnaces 6 and 7 provide the high and low temperatures required, respectively. Furnace 6 provides a temperature of 1250° C. which is slightly above the melting point of gallium arsenide. Furnace 7 provides a temperature in the neighborhood of 610° C. which is near the sublimation temperature of arsenic at the cool end of reaction tube 3. If nothing more were done and the constituents of system 1 were allowed to react, gallium arsenide would be formed in addition to other products. The other products formed are gallous oxide ($Ga_2O$) and silicon as shown by the reaction.

$$4Ga+SiO_2 \rightleftharpoons 2Ga_2O+Si$$

From this reaction, which is reversible, it may be seen that an excess of gallous oxide will prevent the formation of free silicon and thus permit the production of high purity crystals of gallium arsenide.

An excess of gallous oxide may be obtained by introducing a carbon or graphite boat 8 containing quantities of gallic oxide 9 into reaction tube 3 at some intermediate temperature, 1000° C., for instance, to produce the following reaction:

$$2C+Ga_2O_3 \rightleftharpoons Ga_2O+2CO$$

The pressure of gallous oxide ($Ga_2O$) generated is completely temperature dependent. When there is an excess of $C+Ga_2O_3$ and when the reaction starts on the left side, different pressures of $Ga_2O$ may be generated by simply controlling the temperature at which the above reaction takes place. One simple method of controlling the temperature is to displace boat 8 toward the cooler end of reaction tube 3. In this manner, both the resistivity and carrier mobility can be varied making it possible to obtain different resistivities and mobilities for different purposes. It is significant that even though there are lower temperatures in reaction tube 3, the controlling reaction still occurs at the temperature at which the carbon and gallic oxide react.

It has also been found that because of the reaction of carbon with gallic oxide ($Ga_2O_3$), non-contaminating end products are formed which do not enter into the formation of gallium arsenide crystals. One of the difficulties with prior art systems is the presence of gallic oxide on the surface of the gallium arsenide while the crystal is being formed. The presence of the gallic oxide surface film very often rendered the gallium arsenide crystal polycrystalline in structure. With the reaction of the present invention, no surface film is formed and monocrystalline gallium arsenide is obtained without difficulty.

Figure 2:
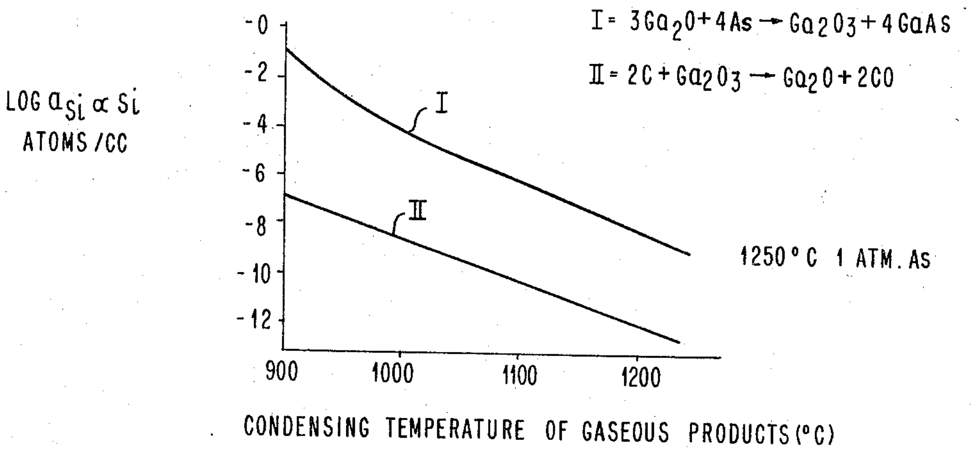
FIGURE 2 is a semi-logarithmic plot of silicon concentration versus the condensing temperature of the gaseous products of two reactions which shows that the silicon concentration suppression is several orders of magnitude better than a system which does not use a carbon-gallic oxide reaction.

Referring now to FIGURE 2, there is shown a semi-logarithmic plot of the activity of silicon in gallium arsenide versus the condensing temperature in ° C. of gaseous products. Since the ultimate result of the reaction of gallic oxide and carbon is to produce a reduction in the silicon contamination of gallium arsenide, the activity of silicon has been chosen as one parameter but, another related parameter such as the pressure of gallous oxide ($Ga_2O$) could have been chosen. It is believed that the presence of the $Ga_2O$ atmosphere is the mechanism whereby the formation of silicon is suppressed and that at different pressures of $Ga_2O$ which are directly related to the temperature at which gallic oxide and carbon are reacted, different amounts of silicon are suppressed.

Curve I of FIG. 2 has been obtained from an article by C. N. Cochran and L. M. Foster titled, "Reactions of Gallium With Quartz and With Water Vapor, With Implications in the Synthesis of Gallium Arsenide," published in the Journal of the Electrochemical Society, vol. 109, No. 2, February 1962. Specifically, curve I of the present FIG. 2 is the same as curve I in FIG. 2 of the aforementioned article. As indicated in the article, contamination by silicon can only proceed further if the vapors are removed which have resulted from the reaction of gallium and quartz in a high temperature zone which has been saturated with the equilibrium partial pressures of the gaseous products. By diffusing to a colder zone the following reaction takes place:

(I) $$3Ga_2O+4As \rightarrow Ga_2O_3+4GaAs$$

Curve I of FIG. 2, therefore, shows the temperatures at which the above reaction occurs to deposit crystalline GaAs and $Ga_2O_3$.

Curve II of FIG. 2, shows the temperatures at which condensation of gallous oxide and carbon monoxide takes place in accordance with the following reaction:

(II) $$2C+Ga_2O_3 \rightarrow Ga_2O+2CO$$

Curve II also shows the activity of silicon in gallium arsenide as it relates to temperatures at which the reaction of carbon and gallic oxide takes place. It should be noted that the activity of silicon for the gallic oxide-carbon reaction is substantially less than that shown in curve I over the temperature range shown indicating that the presence of $Ga_2O$ at different pressures contributes to the suppression of silicon during the growth of gallium arsenide crystals.

With crystals of gallium arsenide obtained from a closed system which incorporates the gallic oxide-carbon reaction, it has been found that silicon suppression has been obtained which may be up to five orders of magnitude better than that obtainable by prior art techniques. In addition, monocrystalline materials are reproducibly obtained and relatively large crystals are produced. Also, relatively large amounts of $Ga_2O_3$ can be utilized to provide the proper pressures of $Ga_2O$ and there is no limitation as to the length of time the pressure can be maintained because the condition does not occur where $Ga_2O$ is no longer being formed. The formation of $Ga_2O$ and the pressure due to it are strictly a function of temperature in the reaction of this invention.

With respect to the temperature at which the gallic oxide and carbon are reacted, it has been found that variations of temperature from 900° C. to 1250° produce different silicon concentrations. Crystals of maximum purity have been obtained at 1000° C., not because this temperature produces minimum silicon contamination, but because above this temperature other reactions take place which cause contamination by materials other than silicon.

In one instance, a monocrystalline crystal of gallium arsenide was obtained by placing 30 grams of gallium in a silica boat at the high temperature end of reaction tube 3. 40 grams of arsenic was then placed at the low temperature end of reaction tube 3. At some point intermediate the extremities of reaction tube 3, a graphite boat containing 0.2 gram of gallic oxide was introduced. This amount of gallic oxide represented an amount which in the course of its reaction with carbon produced an excess of gallous oxide in vapor form. Because of the temperature gradient which exists between the high and low temperature ends of reaction tube 3, the positioning of the graphite boat controls the temperature at which gallic oxide reacts with carbon. Reaction tube 3 was then sealed and evacuated to a high vacuum of less than $10^{-5}$ torr. The gallium and arsenic, heated to temperatures of 1250° C. and 605° C. respectively, reacted, in the usual manner, at the high temperature end of reaction tube 3 to form gallium arsenide and the reaction products of gallous oxide and carbon monoxide were formed at the preferred temperature of 1000° C. and suppression of the contamination of the resulting gallium arsenide crystal by silicon resulted. The various constituents were heated for 16 hours and the first-to-freeze portion of the resulting crystal had a resistivity of 2.7 ohm-cm. and a mobility of 7300 at room temperature and 18,000 at liquid nitrogen temperatures. It is significant to note that prior art techniques have not yielded crystals with such outstanding electrical properties. The resistivity value, for example, is an order of magnitude higher than that obtainable using any prior art technique.

While the invention has been particularly shown and described with reference to a preferred embodiment thereof, it will be understood by those skilled in the art that various changes in form and details may be made therein without departing from the spirit and scope of the invention.

What is claimed is:

1. A method for producing single crystals of gallium arsenide having reduced silicon concentrations comprising the steps of, heating gallium in a silica vessel within a closed system to a temperature above the melting point of gallium arsenide at which gallium and arsenic react to produce gallium arsenide and at which silica reacts with gallium to give gallous oxide and silicon, simultaneously heating arsenic within said closed system in a temperature range near the sublimation temperature of arsenic (613° C.) to vaporize said arsenic, reacting carbon from a graphite boat with a quantity of gallic oxide disposed therein in a temperature range of 900° to 1250° C. to produce carbon monoxide and an atmosphere of gallous oxide to suppress the formation of silicon and, varying the pressure of said gallous oxide atmosphere by varying the reaction temperature of said carbon and said gallic oxide to control the amount of silicon in said gallium arsenide crystal produced by controlling the reaction between gallium and silica.

2. A method for producing gallium arsenide single crystals having reduced silicon concentrations comprising the steps of heating gallium in a silica vessel within a closed system to a temperature of 1250° C. at which gallium and arsenic react to produce gallium arsenide and at which silica reacts with gallium to give gallous oxide and silicon, simultaneously heating arsenic within said closed system to a temperature of 605° C. to vaporize said arsenic, reacting carbon from a graphite boat with a quantity of gallic oxide disposed therein in a temperature range of 900° to 1250° C. to produce carbon monoxide and an atmosphere of gallous oxide to suppress the formation of silicon, and varying the pressure of said gallous oxide atmosphere by varying the reaction temperature of said carbon and said gallic oxide to control the amount of silicon in the gallium arsenide produced by controlling the reaction of silica with gallium.

3. A method for producing gallium arsenide single crystals having reduced silicon concentrations comprising the steps of heating gallium in a silica vessel within a closed system to a temperature of 1250° C. at which gallium and arsenic react to produce gallium arsenide and at which silica reacts with gallium to give gallous oxide and silicon, simultaneously heating arsenic within said closed system to a temperature of 605° C. to vaporize said arsenic, reacting carbon from a graphite boat with a quantity of gallic oxide disposd therein at a temperature of 1000° C. to produce carbon monoxide and an atmosphere of gallous oxide to suppress the formation of silicon, and varying the pressure of said gallous oxide atmosphere by varying the reaction temperature of said carbon and said gallic oxide to control the amount of silicon in the gallium arsenide produced by controlling the reaction of silica with gallium.

4. A method for producing gallium arsenide crystals having reduced silicon contamination in which gallium disposed in a silica boat is reacted with arsenic in a closed system comprising the step of: reacting gallic oxide with carbon to produce an atmosphere of gallous oxide and a compound of carbon to suppress the formation of silicon in said crystal.

5. A method for producing gallium arsenide crystals having reduced silicon contamination in which gallium disposed in a silica boat is reacted with arsenic in a closed system which includes the steps of: placing a quantity of gallic oxide in a carbon boat, introducing said carbon boat into said closed system, and heating said carbon boat in a temperature range of 900° to 1250° C. to produce an atmosphere of gallous oxide and carbon monoxide to suppress silicon contamination during the formation of said crystals within said closed system.

6. A method according to claim 5 wherein the step of heating said carbon boat includes the step of heating said boat to a temperature of 1000° C.

7. A method for producing gallium arsenide single crystals having reduced silicon contamination in which gallium disposed in a silica boat is reacted with arsenic within a closed system at a temperature above the melting point of gallium arsenide to produce said crystals, the step of generating an atmosphere of gallous oxide and carbon monoxide within said system to suppress silicon contamination during the formation of said crystals.

8. A method according to claim 7 wherein the step of generating an atmosphere of gallous oxide and carbon monoxide includes the step of generating said atmosphere over a temperature range of 900°–1250° C.

9. A method according to claim 7 wherein the step of generating an atmosphere of gallous oxide and carbon monoxide includes the step of generating said atmosphere at a temperature of 1000° C.

References Cited

FOREIGN PATENTS 243,914 1/1960 Australia.
249,614 1/1961 Australia.

OSCAR R. VERTIZ, *Primary Examiner.*
H. S. MILLER, *Examiner.*